United States Patent [19]

Kelley et al.

[11] 4,338,660

[45] Jul. 6, 1982

[54] RELATIONAL BREAK SIGNAL GENERATING DEVICE

[75] Inventors: James M. Kelley, San Jose; Fred F. Coury, Sunnyvale, both of Calif.

[73] Assignee: Relational Memory Systems, Inc., Sunnyvale, Calif.

[21] Appl. No.: 29,825

[22] Filed: Apr. 13, 1979

[51] Int. Cl.³ .......................... G06F 7/00; G06F 7/02; G06F 9/00
[52] U.S. Cl. ................................................. 364/200
[58] Field of Search ... 364/200 MS File, 900 MS File; 371/19

[56] References Cited

U.S. PATENT DOCUMENTS 3,576,541 4/1971 Kwan ................................. 364/200
3,937,938 2/1976 Matthews .............................. 371/19

OTHER PUBLICATIONS

Digital Logic Handbook published by Digital Equipment Corporation, pp. 66–67.

Primary Examiner—Gareth D. Shaw
Assistant Examiner—John G. Mills, III
Attorney, Agent, or Firm—Claude A. S. Hamrick

[57] ABSTRACT

A relational break signal generating device including two relational comparators which independently compare an address input from a microprocessor to reference addresses previously input thereto and generate output signals which are fed into a combinational logic circuit that produces false and break signals when a prespecified relationship between the input program address and the two reference addresses occurs. The device also includes a circuit for generating pulses each time a break point is detected.

8 Claims, 3 Drawing Figures

| PROGRAM | | SELECTED REF. ADDRESSES | SELECTED QUAL. CONDITIONS |
|---|---|---|---|
| ADDRESS X | INSTRUCTION | | |
| 1 | NOP | | |
| 2 | NOP | | |
| 3 | LD A, 8H | | |
| 4 | LD H, 3H | | |
| 5 | INPT DO | | A < X |
| 6 | LD DE, IOH | | |
| ⋮ | ⋮ | | |
| 1000 | JP. NEQ, 4687 | | |
| 1001 | CALL PROCESS-HI VAL. | | |
| 1002 | NOP | A = 1002 | |
| 1003 | NOP | | A < X < B |
| 1004 | NOP | | |
| ⋮ | ⋮ | | |
| 5000 | CALL PROCESS-LOW VAL. | | |
| 5001 | RET | B = 5001 | |
| 5002 | PUSH DE | | |
| 5003 | ADD HL | | B > X |
| ⋮ | ⋮ | | |
| 10000 | RET | | |
| 10001 | LD HL, BC | | |
| 10002 | ADD HL, BC | | |

RELATIONAL BREAK SIGNAL GENERATING DEVICE

BACKGROUND OF THE INVENTION

1. Field of the Invention

The present invention relates generally to apparatus used in the field of computer-based system debugging, and more particularly to a relational break signal generating device for monitoring the execution of a computer program and causing the suspension of execution of that program and/or the initiation or termination of external processes as a function of the memory and/or I/O operations being performed by the programmer.

2. Description of the Prior Art

There has long been a need for apparatus capable of monitoring the execution of a computer program and halting the program and/or triggering external processes as a function of the execution of the program. One prior art method used is to replace a particular program instruction with a halt instruction so that if the computer tries to execute the instruction that normally resides at that particular point in the program, the execution sequence will be caused to stop and indicate the attempted instruction execution. This allows the programmer to run the program to a certain point and then examine the results of execution up to that point. By judicious replacement of certain instructions with the halt instructions, the programmer can thus control and monitor the execution of a program.

The problem with this prior art technique is that it cannot be used in software in which the program is stored in ROMs since it is not possible to replace an instruction in a ROM with a halt instruction.

Another prior art method is to place an instruction in the monitored program which will cause the computer to jump to a control program and allow easier access to memory. However, the problem with this technique is that the frequent jumping to a control program to log certain types of data, or to check and see if a break point condition has occurred, means that the program is not allowed to run in real time.

The present invention extends the concept of break point control to that of (a) relational breaks and (b) between limits breaks (break regions). Relational breaks are defined to include the following:

(1) If $X = A$, then break.
(2) If $X > A$, then break.
(3) If $X < A$, then break.
(24) If $X \geq A$, then break.
(5) If $X \leq A$, then break.

Thus, the equality break point (Case 1) is the most simple case of a relational break. Note that for efficiency of hardware realization, Cases 4 and 5 may be achieved by letting $A = A' + 1$, in which case Case 4 is equivalent to Case 2, and letting $A = A' - 1$, wherein Case 5 is equivalent to Case 3.

In the industry, break points are used to facilitate software debugging, hardware debugging and software/hardware debugging. The break point concept is used in logical analyzers (hardware), in-circuit emulation (hardware), monitors (computer program), debug executives (computer program) and the front panel of computers.

The generalization concept of break point to include relational points and breaks and break regions greatly improves the ability of an engineer to debug software, debug hardware, or debug hardware/software systems and make performance measurements within the computer system. The use of the relational break concept for software debugging increases the ability of the computer program to locate malfunctioning software by permitting him to establish a "window" around the portion of the computer program that is malfunctioning and then to "close in on the error" until the part of the program which is malfunctioning is located. This is to be contrasted with the use of a break point which requires considerably more user interaction and may necessitate single step execution of the program. In some cases it is practically impossible to use break point to determine an error due to the real time constraints within which the program must be executed.

The use of relational and regional breaks for hardware debugging is very powerful in the detection of intermittent hardware failure which causes the hardware to cease proper program execution erratically and unpredictably. Break points cannot be effectively used for this purpose because that technique requires that one know in advance where to place the break point.

SUMMARY OF THE PRESENT INVENTION

It is therefore a principal object of the present invention to provide a relational break signal generating device which can monitor a program during its execution and cause the suspension of execution of that program and/or the initiation or termination of external processes when a prespecified program event occurs.

Another objective of the present invention is to provide a device of the type described which operates in real time and does not require that a program under test be modified in any way to implement the monitoring operation.

Still another object of the present invention is to provide a device of the type described which uses combinational logic to recognize predetermined relational conditions.

Briefly, a preferred embodiment of the present invention includes two relational comparators, the inputs of which each include a specifiable reference address, the address lines from a microprocessor and several qualifying inputs. The comparators independently compare the address from the microprocessor to the reference address input thereto and generate output signals which are fed into a combinational logic circuit which produces false and break point signals when a prespecified relationship between the input program address and the two reference addresses occurs. Although the present invention has general application, the particular preferred embodiment disclosed is embodied in a microcomputer in-circuit emulator and is used to generate pulses and/or cause program break points under specified conditions.

An important advantage of the present invention is that it allows any computer program to be monitored on a real time basis.

Another advantage of the present invention is that it allows the occurrence of specified events during program execution to be counted or cause signals to be developed which will interrupt execution of the program.

There and other advantages of the present invention will no doubt become apparent to those skilled in the art after having read the following detailed description of the preferred embodiment which is illustrated in the drawing.

IN THE DRAWING

DETAILED DESCRIPTION OF THE PREFERRED EMBODIMENT

Figures 1, 2:
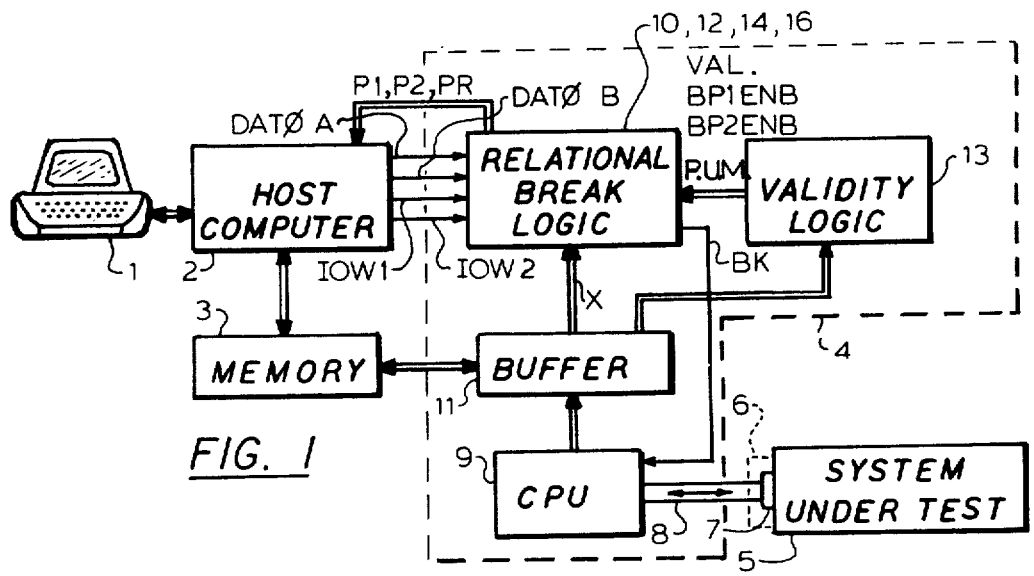
FIG. 1 is a block diagram illustrating a computer program debugging system including relational break logic in accordance with the present invention.
FIG. 2 is a diagram used to illustrate operation of the present invention.

In FIG. 1 of the drawing a computer program debugging system is shown including a CRT input terminal 1, a host computer 2, a memory unit 3 and an in-circuit emulator 4. A device including a program under test is shown at 5. The device 5 may include any type of computer controlled device or system which includes a resident CPU shown in phantom at 6. In order to debug or otherwise monitor operation of the device 5, the resident CPU 6, typically in the form of a dual in-line packaged device, is removed and replaced by a multi-contact plug 7 which, via a multiwired cable 8, substitutes the CPU 9 of emulator 4 into device 5.

Figure 3:
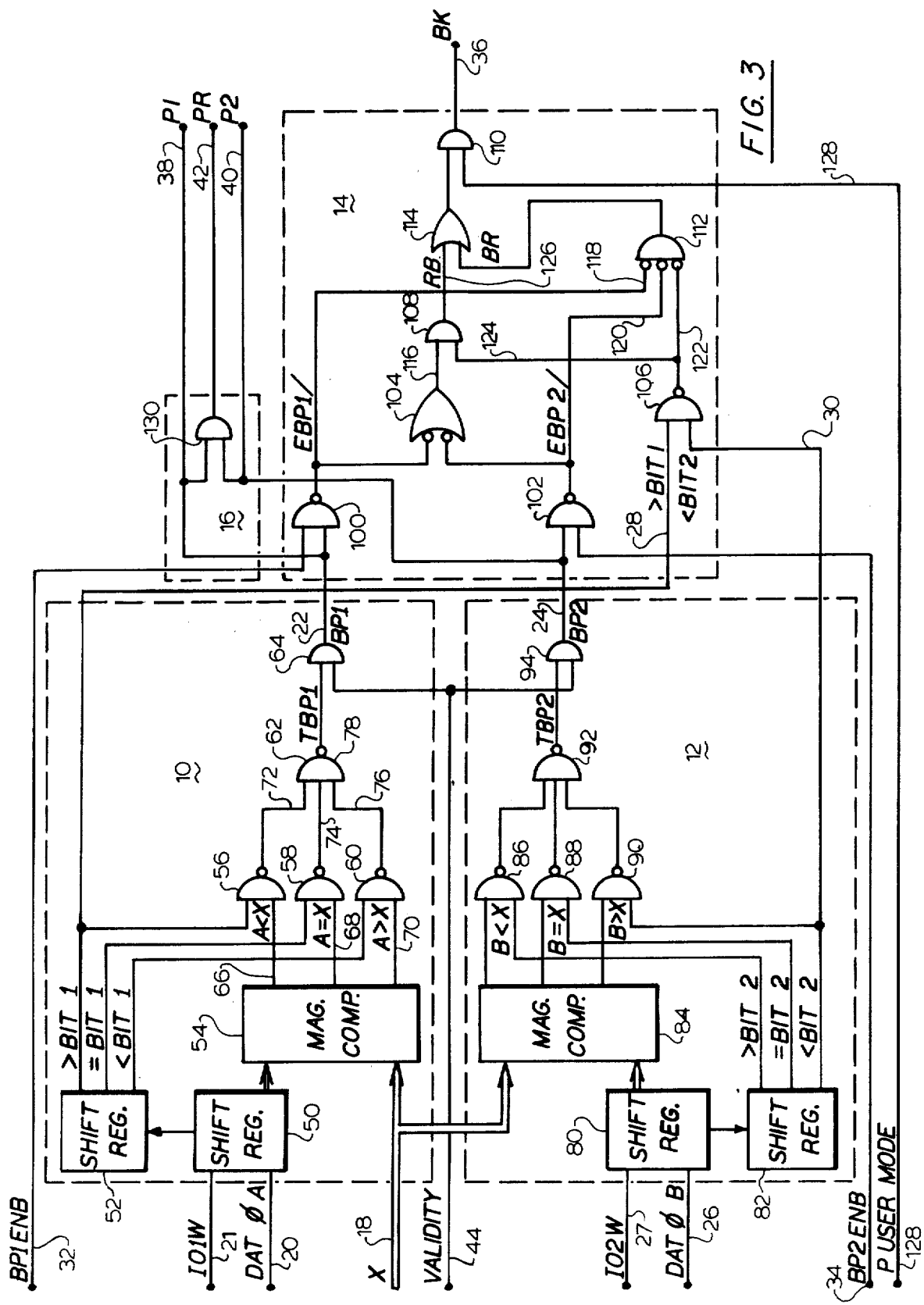
FIG. 3 is a diagram schematically illustrating a relational break signal generating device in accordance with the present invention.

In addition to the CPU 9, emulator 4 also includes break logic 10, 12, 14, 16 which forms the substance of the present invention, the component parts of which are illustrated in more detail in FIG. 3 hereof, a buffer 11 and validity logic 13. In using the illustrated system an operator or programmer technician can enter a pair of related addresses, arbitrarily designated A and B, of the on-board program of device 5 into the break logic of emulator 4 via console 1 and host computer 2, and at the same time select any of 17 qualifying conditions relating a real time program address X to the pair of selected addresses A nd B.

By way of example, reference is made to FIG. 2 of the drawing which illustrates, in the first column, a series of program addresses X, and in the second column, examples of program instructions corresponding to each address X a pair of selected reference addresses A and B are indicated, and in column 4, a set of selected qualifying conditions are shown. By selecting the first reference A as address 1002 and the second address B as 5001, and by selecting the qualifying conditions so as to identify a break region including all addresses between 1002 and 5001, i.e., $A<X$, $B>X$, and therefore $A<X<B$. After reading the following description, it will be appreciated that break logic 10-16 of emulator 4 will generate a break signal at any time that the program enters the portion of the program including addresses 1003 through 5000. Although prior art systems such as that described in U.S. Pat. No. 3,937,938 of Matthews have been able to generate break signals any time that a particular address is found to be equal to or less than a first break point A, or when an address is found to be equal to or greater than a second break point address B, none have been able to define a break region including a set of selected serial regions of addresses lying between two selected A and B such that if an address lying within the region is called for execution, a break signal will be generated.

The present invention is thus directed to a particular set of break logic circuitry illustrated in FIG. 3 which enables a programmer to not only define break points, such as the selected addresses A and/or B for example, in debugging a program but also to define break regions such that a break signal will be generated any time any address within the break region is called for execution.

In accordance with the present invention the emulator 4 shown in the system of FIG. 1 allows the operator to display on terminal 1 the state of CPU 9 at the time a break signal is generated; he can obtain information from the emulator unit 4 as to the specific cause of the break, i.e., which of the 17 types of conditions described below occurred to cause the break; he can display a preselected number of previous instructions executed by the CPU 9 immediately preceding the break; and he can examine and modify the on-board memory of the device 5 and even substitute a portion of the test system memory for a defective portion of the memory of device 5 in order to allow a continuation of the test of the device where a defective portion of the on-board program is detected. Such a system greatly improves the facility with which an operator or technician can debug a program or otherwise locate system malfunctions in a computer controlled electronic system.

Referring now to FIG. 3 of the drawing, a simplified embodiment of a relational break signal generating device in accordance with the present invention is schematically illustrated. As set out by the dashed lines, the device generally includes a first relational comparator circuit 10, a second relational comparator circuit 12, a combinational logic circuit 14 and a pulse generating circuit 16.

Generally stated, the relational comparators 10 and 12 selectively check for conditions (1) $A<X$, $A=X$, $A>X$ and (2) $B<X$, $B=X$, $B>X$ and the combinational logic 14 checks for the condition (3) $A<X<B$.

A and B are preset words with a binary or binary-coded decimal value and are defined by the system operator and entered into the comparators from a console device (not shown).

X is a rapidly changing word with a binary or binary-coded decimal magnitude. A validity signal developed on an input terminal 44 and input to both comparator 10 and comparator 12 simultaneously indicates that a signal X is stable when it is high and that the results of the comparison being performed are valid. The outputs generated by comparators 10 and 12 are either enable or disabled independently via BP1ENB and BP2ENB signals which are applied to logic 14 via terminals 32 and 34, respectively.

The conditions (1) and (2) indicated above are called relational comparisons and the results of such comparisons are used to derive the "break region" comparison given in condition (3). Note that the conditions (1) and (2) contain as a subset thereof the traditional break point concept $A=X$ and $B=X$ implemented in current in-circuit emulators, logic analyzers and program monitors.

The combinational logic contained in block 14 further discriminates between relational break and break region conditions and forms a single break signal output BK at terminal 36 which is used to trigger an event such as a break in emulation or a cessation of trace history in a logic analyzer. More specifically, comparator circuit 10 compares changing program memory addresses X input at a terminal 18 to a preselected reference address input at a terminal 20 and develops a break point signal BP1 at its output 22 when a preselected relationship exists between the program address X and the reference address A. The qualifier data indicating the preselected relationship ($A<X$, A=X or A>X) is also input to comparator circuit 10 via DATφ terminal 20.

Comparator circuit 12 functions in the same manner as circuit 10 and develops a second break point signal BP2 at its output 24 when a preselected relationship exists between the address X input at terminal 18 and a second preselected reference address B is input at the DATφ terminal 26. The second preselected relationship is selected from one of the three relationships B<X, B=X and B>X, and data corresponding thereto is also input to circuit 12 via DATφ line 26.

Logic circuit 14 includes combinational logic which responds to qualifier signals >BIT1 and <BIT2 applied at inputs 28 and 30, respectively, and break point enable signals BP1ENB and BP2ENB input at terminals 32 and 34, respectively, and combines the break point signals BP1 and BP2 input thereto at 22 and 24 to develop a break signal BK at output 36 when a preselected relationship exists between the input address X and the reference addresses A and B.

Pulse generating circuit 16 responds to the break point signals developed at 22 and 24, and generates an output pulse P1 at terminal 38 each time a break point signal BP1 is developed on line 22; generates an output pulse P2 at terminal 40 each time a break point signal BP2 is developed on line 24; and generates an output pulse region output pulse PR at terminal 42 each time pulses P1 and P2 exist simultaneously.

The comparator circuit 10 is comprised of a 16-bit shift register 50, a 3-bit shift register 52, a magnitude comparator 54, four NAND gates 56, 58, 60 and 62, and an AND gate 64. The shift registers 50 and 52 are serial input/parallel output registers into which reference data A is shifted via terminal 20 in response to clock pulses input at IO1W terminal 21. More particularly, the reference data is comprised of 3 bits of qualifying data which is input to register 52 and 16 bits of address data which is input to register 50.

Comparator 54 is a high-speed magnitude comparator which performs comparison of straight binary or BCD codes. It compares the reference data A contained in register 50 to the program data X input on line 18 and develops three fully decoded outputs on lines 66, 68 and 70. An output will be developed on line 66 if the magnitude of X is greater than the magnitude of A; an output will be developed on line 68 if the magnitude of X is equal to the magnitude of A; and an output will be developed on line 70 if the magnitude of X is less than A.

The outputs of comparator 54 are input to the NAND gates 56, 58 and 60, respectively, along with qualifying data from shift register 52, and as a result an output will be developed on one of the lines 72, 74 or 76 if a comparator output is generated which corresponds to the bit that is set in shift register 52. This will cause an output to be developed by NAND gate 62 on line 78 which is designated as a tentative break point TBP1 and is input to one side of AND gate 64. If a validity input is applied via terminal 44 to the other side of AND gate at the same time TBP1 exists, a break point output TP1 will be developed at 22.

Comparator circuit 12 is identical to that of comparator circuit 10 and includes shift registers 80 and 82, a magnitude comparator 84, NAND gates 86, 88, 90 and 92, and an AND gate 94. Circuit 12 compares the reference data B input at terminal 26 to the program data X input at terminal 18, and if the specified conditions are met, develops a second break point signal BP2 at 24.

The combinational logic circuit 14 includes NAND gates 100, 102, 104 and 106, AND gates 108 and 110, a NOR gate 112, and an OR gate 114. The gates 100 and 102 receive the break point signals BP1 and BP2 respectively, along with the enable signals BP1ENB and BP2ENB, and develop outputs EBP1/ and EBP2/ if an output exists on lines 22 and 24 at the time that the enable signals are raised. The signals EBP1/ and EBP2/ are input to NAND gate 104 to develop an output on line 116 when the two signals exist simultaneously, and such signal is input to one side of AND gate 108.

At the same time the signals EBP1/ and EBP2/ are applied to two of the inputs 118 and 120 of NOR gate 112. The >BIT1 input stored in register 52 is input to one side of NAND gate 106 while the <BIT2 stored in register 82 is input to the other side of NAND gate 106. An output developed by NAND gate 106 on line 122 is input to NOR gate 112. The same signal will also be input to AND gate 108 on line 124. If both inputs to AND gate 108 are true, then a relational break signal RB will be developed on line 126 for input to OR gate 114. In response to the signals EBP1/, EBP2/ and the output of NAND gate 106, NOR gate 112 will develop a break region signal BR for input to OR gate 114. In response to the signals BR and/or RB an output will be developed by OR gate 114 for input to AND gate 110 and if gate 110 is enabled by a P USER MODE signal input on line 128, a break signal BK will be developed at output 36.

Pulse generator 16 includes an AND gate 130, the inputs of which are coupled across lines 22 and 24. Each time a break point signal BP1 is developed on line 22 a pulse P1 is developed at terminal 38, and each time a break point signal BP2 is developed on line 24 a pulse P2 is developed at terminal 40. And each time that both P1 and P2 exist simultaneously, AND gate 130 will cause a pulse PR to be developed at terminal 42.

To assist the reader in understanding operation of the present invention, the following table of definitions and list of possible break cases are given.

TABLE OF DEFINITIONS

IO1W—Clock input to shift register in A
DATφ A—Data input to shift register in A
BP1ENB—Enable signal for BP1
X—Variable word
Validity—This signal when high indicates that X is valid
IO2W—Clock input to shift register in B
DATφ B—Data input to shift register in B
BP2ENB—Enable signal for BP2
P USER MODE—This signal when high enables the BK output
>BIT1—Enables/disables A<X for first relational comparator
=BIT1—Enables/disables A=X for first relational comparator
<BIT1—Enables/disables A>X for first relational comparator
A<X—Output of magnitude comparator 54
A=X—Output of magnitude comparator 54
A>X—Output of magnitude comparator 54
TBP1—Tentative break point signal
BP1—Break point signal
>BIT2—Enables/disables A<X for second relational comparator
=BIT2—Enables/disables A=X for second relational comparator <BIT2—Enables/disables A>X for second relational comparator
B<X—Output of comparator 84
B=X—Output of comparator 84
B>X—Output of comparator 84
TBP2—Tentative break point signal
PB2—Break point signal
EBP1/—Enabled and complemented break point signal for relational comparator 10
EBP2/—Enabled and complemented break point signal for relational comparator 12
BR—Break region signal
RB—Relational break signal
BK—Break signal
P1—Relational strobe pulse
P2—Relational strobe pulse
PR—Pulse region strobe pulse

LIST OF BREAK CASES

Case 1.* If A=X then break.
Case 2. If A>X then break.
Case 3. If A<X then break.
Case 4.* If B=X then break.
Case 5. If B>X then break.
Case 6. If B<X then break.
Case 7. If A<X<B then break.
Case 8. If A=X or B>X then break.
Case 9.* If A=X or B=X then break.
Case 10. If A=X or B<X then break.
Case 11. If A<X or B>X then break.
Case 12. If A<X or B=X then break.
Case 13. If A<X or B<X then break.
Case 14. If A>X or B>X then break.
Case 15. If A>X or B<X then break.
Case 16. If A>X or B=X then break.
Case 17.* All breaks disabled.

Note that only the four cases marked with the asterisk (*) are possible using conventional break logic.

Each of the above cases can be evaluated by inspection of the circuit using the following parameters:

```
Case 1. If A = X then break:
    BP1ENB = 1          BP2ENB = 0
    >BIT1 = 0           >BIT2 = 0
    =BIT1 = 1           =BIT2 = 0
    <BIT1 = 0           <BIT2 = 0
    Validity = 1        when X is valid.
    TBP1 = 1            TBP2 = 0
    BP1 = 1             BP2 = 0
    EBP1/ = 0           EBP2/ = 1
    BR = 0
    RB = 1
    P USER MODE = 1
    BK = 1
Case 2. If A > X then break:
    BP1ENB = 1          BP2ENB = 0
    >BIT1 = 1           >BIT2 = 0
    =BIT1 = 0           =BIT2 = 0
    <BIT1 = 0           <BIT2 = 0
    Validity = 1        when X is valid.
    TBP1 = 1            TBP2 = 0
    BP1 = 1             BP2 = 0
    EBP1/ = 0           EBP2/ = 1
    RB = 1
    BR = 0
    P USER MODE = 1
    BK = 1
Case 3. If A < X then break:
    BP1ENB = 1          BP2ENB = 0
    >BIT1 = 0           >BIT2 = 0
    =BIT1 = 0           =BIT2 = 0
    <BIT1 = 1           <BIT2 = 0
    Validity = 1        when X is valid.
```
```
    TBP1 = 1            TBP2 = 0
    BP1 = 1             BP2 = 0
    EBP1/ = 0           EBP2/ = 1
    BR = 0
    RB = 1
    P USER MODE = 1
    BK = 1
```

Cases 4, 5 and 6 are the same as Cases 1, 2 and 3 because comparator circuit 12 is identical to comparator circuit 10.

```
Case 7. If A < X < B then break:
    BP1ENB = 1          BP2ENB = 1
    >BIT1 = 1           >BIT2 = 0
    =BIT1 = 0           =BIT2 = 0
    <BIT1 = 0           <BIT2 = 1
    Validity = 1        when X is valid.
    TBP1 = 1            TBP2 = 1
    BP1 = 1             BP2 = 1
    EBP1/ = 0           EBP2/ = 0
    BR = 1
    RB = 0
    P USER MODE = 1
    BK = 1
```

Cases 8 through 16 are variants of Case 7.

Case 17. All breaks may be disabled by setting BP1ENB=BP2ENB=0.

In addition to the above, it is also of interest to note the following list of pulse outputs generated by circuit 16 and corresponding to the various break cases.

LIST OF PULSE CASES

Case 1. If A=X then P1.
Case 2. If A>X then P1.
Case 3. If A<X then P1.
Case 4. If B=X then P2.
Case 5. If B>X then P2.
Case 6. If B<X then P2.
Case 7. If A<X<B then PR, P1, P2.
Case 8. If A=X or B>X then P1 or P2.
Case 9. If A=X or B=X then P1 or P2.
Case 10. If A=X or B<X then P1 or P2.
Case 11. If A<X or B>X then P1 or P2.
Case 12. If A<X or B=X then P1 or P2.
Case 13. If A<X or B<X then P1 or P2.
Case 14. If A>X or B>X then P1 or P2.
Case 15. If A>X or B<X then P1 or P2.
Case 16. If A>X or B=X then P1 or P2.
Case 17. Pulses may be enabled or disabled by external gates and registers.

It should be noted that the pulse outputs are always enabled even during the time that break points are enabled or disabled. Furthermore, these pulse outputs or strobe signals may be input to frequency counters, oscilloscope triggers, logic analyzer triggers or any other TTL compatible logic. Possible uses of such signals are (1) to provide a determination of how many times a given subroutine is called during the execution of a program;

(2) to provide an indication of the percentage of stack references to execution time; and (3) to provide a display of program timing.

Even though the present invention has been described above with relation to a preferred but simplified embodiment, it is to be understood that as actually implemented the device will most likely include additional qualifying logic appropriate to a particular application. Moreover, it is contemplated that the presetn invention can be extended to have the capability of making even more complex comparisons involving more than one variable X. For example, if two variables are to be considered, as in an instruction such as "If (A<X<B) and (C<Y<D) then break," the outputs of two such circuits as described above would be AND'd together. Higher pluralities of variables could likewise be accommodated in the same manner.

Although numerous alterations and modifications of the preferred embodiment will no doubt become apparent to those skilled in the art after having read the above description, it is intended that the appended claims not be limited by such description but be integrated as covering all such alterations and modifications as fall within the true spirit and scope of the invention.

What is claimed is:

1. A relational break signal generating device for use in debugging and monitoring the execution of computer programs and producing break signals when a particular relationship exists between an input program address signal and a pair of selected reference address signals which define an address region, comprising:

first relational comparing means for comparing each address X of an input program signal to the address A of a first selected reference signal and for developing a first break point signal when certain first qualifying conditions specifying a particular relationship between the input address X and the address A of said first reference signal are met;

second relational comparing means for comparing each address X of said input program signal to the address B of a second selected reference signal and for developing a second break point signal when certain second qualifying conditions specifying a particular relationship between the input address X and the address A of said second reference signal are met; and combinational logic means for monitoring said first and second break point signals and for generating a break signal when one of said break point signals exists and certain third qualifying conditions are met, said third qualifying conditions including either the condition that the magnitude of the address X of said input program signal is greater than the magnitude of the address A of said first reference signal but less than the magnitude of the address of said second reference signal or the condition that the magnitude of the address X of said input progress signal is either less than or equal to the magnitude of the address A of said first reference signal or that the magnitude of the address X of said input program signal is either greater than or equal to the magnitude of the address B of said second reference signal.

2. A relational break signal generating device as recited in claim 1 wherein said first reference signal is comprised of first qualifying date, specifying said first qualifying conditions, and said address A, and wherein said first comparing means includes a first magnitude comparator for comparing each address X of said input program signal to said address A and for developing a first comparison signal if the magnitude of an input address X is greater than the magnitude of said address A, a second comparison signal if the magnitude of an input address X is equal to the magnitude of said address A, and a third comparison signal if the magnitude of an input address X is less than the magnitude of said address A and means for enabling a selected one of said comparison signals to cause said first break point signal to be developed.

3. A relational break signal generating device as recited in claim 2 wherein said second reference signal is comprised of second qualifying data, specifying said second qualifying conditions, and said address B, and wherein said second comparing means includes a second magnitude comparator for comparing each address X of said input program signal to said address B and for developing a fourth comparison signal if the magnitude of an input address X is greater than the magnitude of said address B, a fifth comparison signal if the magnitude of an input address X is equal to the magnitude of said address B, and a sixth comparison signal if the magnitude of an input address X is less than the magnitude of said address B, and means for enabling a selected one of said comparison signals to cause said second break point signal to be developed.

4. A relational break signal generating device as recited in claim 3 and further comprising:

pulse generating means for generating a first output signal pulse each time said first break point signal is generated, a second output signal pulse each time said second break point signal is generated, and a third output signal pulse each time said first break point signal and said second break point signal are generated simultaneously.

5. A relational break signal generating device as recited in claim 1, 2, 3 or 4 wherein said combinational logic means includes means for developing a break region signal BR when said first break point signal and said second break point signal, exist and when said third qualifying conditions are that the magnitude of the address X of said input program signal is greater than the magnitude of the address A of said first reference signal but less than the magnitude of the address B of said second reference signal.

6. A relational break signal generating device as recited in claim 1, 2, 3 or 4 wherein said combinational logic means includes means for developing a relational break signal RB when either said first break point signal or said second break point signal exist and when said third qualifying conditions are the magnitude of the address X of said input program signal is either less than or equal to the magnitude of the address A of said first reference signal, or that the magnitude of the address X of said input program signal is either greater than or equal to the magnitude of the address B of said second reference signal.

7. A relational break signal generating device as recited in claim 1, 2, 3 or 4 wherein said combinational logic means includes first logic circuitry for developing a break region signal BR when said first break point signal and said second break point signal exist and said third qualifying conditions are that the magnitude of the address X of said input program signal is greater than the magnitude of said address A but less than the magnitude of said address B, and second logic circuitry for generating a relational break signal RB when either said first break point signal or said second break point signal exist and said third qualifying conditions are that the magnitude of the address X of said input program signal X is either less than or equal to the magnitude of said address A or that the magnitude of the address X of said input program signal is either greater than or equal to the magnitude of said address B.

8. A relational break signal generating device as recited in claim 7 wherein said combinational logic means further includes third logic circuitry for developing said break signal whenever either said break region signal BR or said relational break signal RB is developed and a user mode signal is input thereto.

* * * * *